Figure 1:
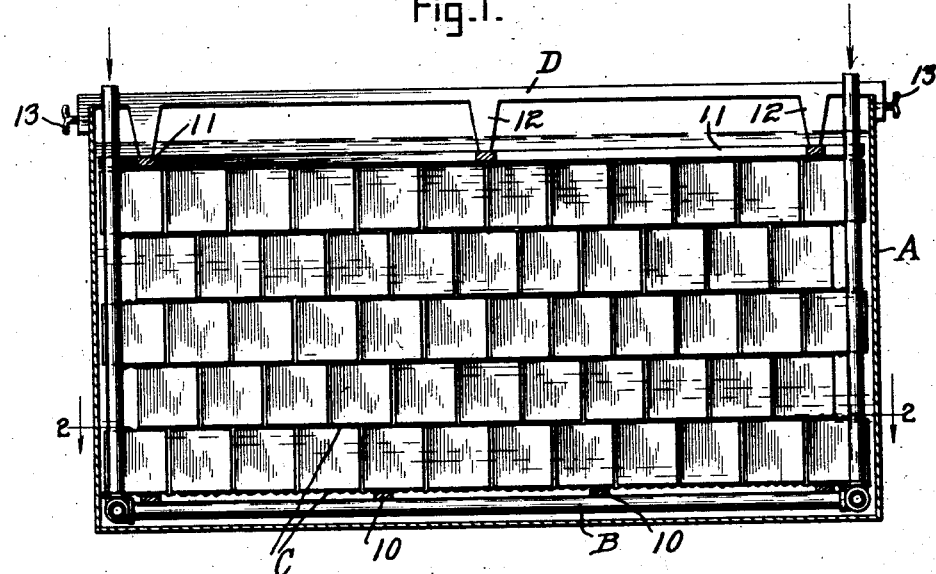

H. W. NORDYKE.
PROCESS OF TREATING SEPARATORS FOR STORAGE BATTERIES.
APPLICATION FILED APR. 26, 1921.

1,415,683.

Patented May 9, 1922.

Inventor
Horace W. Nordyke

By E. W. Binford
Attorney

UNITED STATES PATENT OFFICE.

HORACE W. NORDYKE, OF INDIANAPOLIS, INDIANA, ASSIGNOR TO INDIANAPOLIS MANUFACTURING COMPANY, OF INDIANAPOLIS, INDIANA, A CORPORATION OF INDIANA.

PROCESS OF TREATING SEPARATORS FOR STORAGE BATTERIES.

1,415,683.     Specification of Letters Patent.     Patented May 9, 1922.

Application filed April 26, 1921. Serial No. 464,607.

*To all whom it may concern:*

Be it known that I, HORACE W. NORDYKE, a citizen of the United States, residing at Indianapolis, in the county of Marion and State of Indiana, have invented certain new and useful Improvements in Processes of Treating Separators for Storage Batteries, of which the following is a specification.

My said invention consists in the method and means for treating woods, for separators for storage batteries and in the improved separator resulting from such treatment, whereby a class of woods is made available for use in the manufacture of such separators heretofore found objectionable for such purpose because their cellular structures are commonly filled or obstructed with resinous and other gummy and coloring substances which prevent porosity and diffusion of the electrolyte and cause high internal resistance in a battery.

My said treatment for wood separators is, therefore, particularly designed to be applied to woods the cellular structure or pores of which are commonly filled or obstructed with gums, etc., or resinous or highly colored woods of that class which do not in a natural state contain acetic acid, or substances which ordinarily produce acetic acid under electrolysis in sulphuric acid in such quantity so that the presence of said substances would be deleterious to lead under the conditions imposed by use in storage batteries.

In the class of woods particularly in mind to be treated by my process are Port Orford and other cedars; Noble and other firs; redwood; and other woods having similar properties. The class of woods referred to are commonly termed "coniferous" or "resinous" woods and by the use of either of these terms in this specification or the claims herein, such class of woods will be understood to be referred to. The natural cell structure of such woods is peculiarly adapted for such service as required in storage battery separators. First, the cells are comparatively larger than in the woods of other classes so that when the resinous and other substances have been removed, leaving only the cellular structure, a comparatively large porosity is secured with a correspondingly lessened resistance in the transmission of battery current. Second, the cellular structure is of a coarser and stronger nature than in wood of other classes which insures a longer life and service to separators made therefrom. For these reasons the adaptation of such wood to such service is very desirable but the removal of the resinous and other gummy and such like substances from the pores of the wood to such a degree as to eliminate the natural resistance to the transmission of current has not been possible by processes heretofore employed.

It is the particular object of this process to remove the resinous and other coloring and pore obstructing substances which prevent porosity and diffusion of the electrolyte and effect high internal resistance in a battery. When these substances have been removed such woods possess marked advantages over other classes of woods heretofore most commonly used for this purpose, such as basswood, in that they have longer life and greater mechanical strength; and as well, have high porosity and afford low internal resistance in a battery. Moreover, they will remain flat in handling and do not have the tendency to assume distorted shapes, which also is a great advantage. The greater strength results from the naturally stronger cell wall structure and formation and this also gives longer life and consequent greater service. Thus separators made of this class of woods, when treated by this process, have many desirable characteristics which heretofore have been lacking in separators in common use, inasmuch as the hard resinous woods have not been satisfactorily treated to remove these pore obstructing substances and the class of woods which do not contain these substances do not have the advantage of great strength and long life when exposed to the conditions imposed by use in a battery.

My said treatment embodies a process comprising two operations: one, the formation of soluble products of the resinous materials, which is accomplished by the presence of salts of sulphuric or sulphurous acids; the other, the distillation of the volatile materials contained in the resin.

Figure 2:
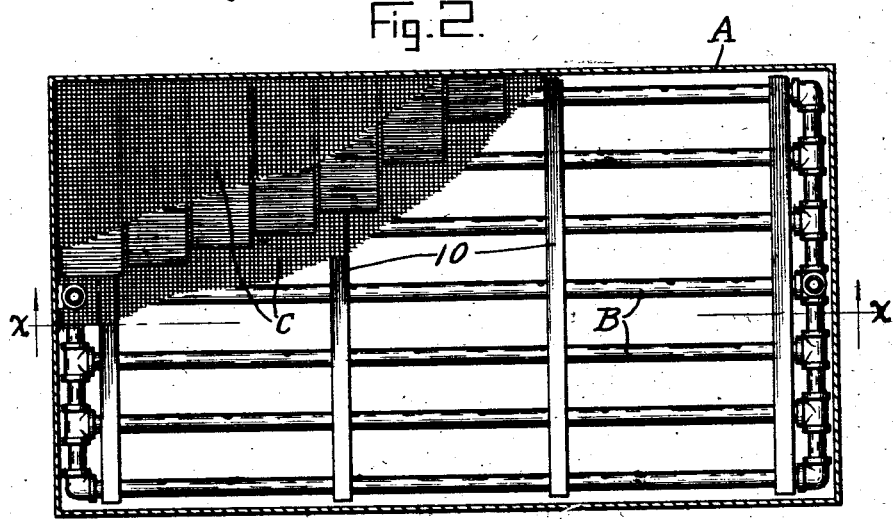
Figure 3:
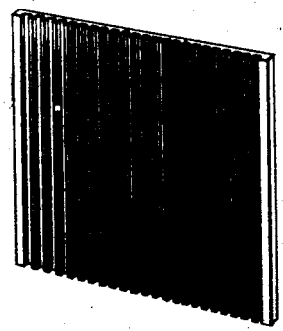

Referring to the accompanying drawings which are made a part hereof and on which similar reference characters indicate similar parts, Figure 1 is a central vertical section through an apparatus such as is employed for the purpose of my process, Figure 2 is a horizontal section on the dotted line 2—2 in Figure 1, and Figure 3 a detail view showing one of the separators.

In said drawings the portions marked A represent the vat, B the steam pipes, C wire cloth supports on which the separators rest while under treatment in the vat, and D a holding device for holding the separators submerged in the solution in the vat, all of which parts and their arrangement will be readily understood from the drawing, and it will be further understood that such arrangement may be modified and changed as may be found desirable from time to time without departing from the spirit or purpose of my said invention, this apparatus being illustrated chiefly as merely illustrative of an apparatus suitable for the purpose of practicing said process. It will be noted that the lower wire screen C rests upon cross supports 10 and that cross bars 11 extend across the upper surface of the upper screen, legs 12 on the bar D resting upon said cross bars 11 and said cross bar D being held in position by a clamping screw 13.

The method of treatment is substantially as follows:

The separators are placed in the open vat A containing a solution of water and substantially 5% of sodium bisulphite, or other salts which will effect the solution of the pore obstructing substances. Any salt may be used which will convert such substances into soluble products, and slight traces of which salts are not injurious to lead-sulphuric acid batteries. With the separators submerged in this solution, live steam is passed through it and between them by means of tubes B provided in the bottom of the vat, and the temperature is maintained at about 212 Fahrenheit in an open vat for approximately twelve hours. After the solution comes to the boiling point the live steam passing between the separators carries the oils which are liberated from the resinous, or similar pore obstructing substances, to the surface where they are carried away by the steam from the vat. It will be understood, of course, that the steam for thus treating the separators may be conveyed to the bottom of the vat or generated within the vat in any appropriate manner or by any appropriate means, the essential step being that the steam shall cause ebullition to carry off the oils and volatile materials and free the wood therefrom.

After approximately twelve hours the solution is slowly drained off and sufficient water supplied to keep the separators submerged; meanwhile continuing the boiling process by the admission of steam, or otherwise, as above described, and this operation is continued until a substantially clear and colorless solution is obtained in the vat. This method of treatment thoroughly removes the pore obstructing substances found in the class of woods above described, and leaves a clear white cellulose structure in excellent mechanical condition, and having a maximum porosity, so that both a very low internal resistance is obtained in the battery, and a very rapid diffusion of electrolyte through the separators is secured.

I have conducted extensive experiments and investigations to discover the cause of high internal resistance in a large number of storage batteries using separators of woods containing resinous substances. Because of such resistance batteries, as is well known, fail to perform satisfactorily in delivering heavy currents, as are required in cold weather starting, and develop permanent troubles which make them practically valueless for the purpose for which they are designed. I have discovered that the trouble commonly results from the localization of current travel through the separator in portions ranging from approximately 20% to 50% of the entire surface of the separator. I found such portions to be very irregular and upon investigation appear to have been the areas of the separator containing the least resinous or pore obstructing substance. This shows that the current passes through the portions when the pores are least obstructed until it establishes a definite region or locality of travel. The rest of the separator becomes covered with a white deposit of lead sulphate. All effort to break down this high resistance section and to remove the lead sulphate by charging and discharging failed and in order to make the battery perform it was necessary to replace the defective separators with new ones. It was further noted that in such cases the negative plates showed a very uneven condition, the portions coincident with the working portions of the separator, showing signs of having been overworked while those portions coincident with the inactive portion of the separator were badly sulphated. By such experiments and investigations I have discovered that the elimination of all the resinous and such like substances from the separator, or as nearly all as possible, is not only necessary from the standpoint of producing low internal resistance in the battery but also from the standpoint of giving satisfactory service of the battery for the longest possible period of time and permitting the battery to have a normal condition throughout its elements and over the entire surface of all the plate, so that the battery will give satisfactory service over as long a period of time as is possible with the construction and the materials used in the plates. My present invention therefore includes this discovery and the method and means of accomplishing the result and the separator produced thereby.

Having thus fully described my said invention, what I claim as new and desire to secure by Letters Patent, is:

1. The process of removing pore obstructing resinous and highly colored substances from wood which consists in subjecting such wood to a combined solution and vaporization process by boiling in an open vat in a solution of a salt of sulphuric or sulphurous acid which will form soluble products of such substances so that they may be washed out, and the removal of the volatile oil contained in said substances by means of live steam passing through the solution, substantially as set forth.

2. In the manufacture of wood separators for storage batteries, the process of removing from the wood pore obstructing substances by subjecting the wood to boiling in a solution of a salt of sulphuric or sulphurous acid and vaporizing off the volatile substances by passing live steam through the solution, substantially as set forth.

3. In the manufacture of wood separators for storage batteries, the process for removing pore obstructing substances from the wood which consists in submerging the wood in a solution of a salt of sulphuric or sulphurous acid, boiling the same and maintaining the solution in a state of ebullition, whereby the volatile substances are vaporized and driven off, substantially as set forth.

4. In the manufacture of wood separators for storage batteries, the process of reducing the wood to substantially pure cellulose which consists in boiling said wood in a solution of a salt of sulphuric or sulphurous acid and then maintaining such a solution in a state of ebullition to vaporize and carry off the substances contained in said wood subject to solution and vaporization, substantially as set forth.

5. In the manufacture of wood separators for storage batteries, the process of reducing the wood to substantially pure cellulose which consists in boiling said wood in a solution of a salt of sulphuric or sulphurous acid and then maintaining such a solution in a state of ebullition to vaporize and carry off the substances contained in said wood subject to solution and vaporization and draining off the solution from time to time and supplying additional water to keep the wood submerged, until said wood is substantially free of all such substances, substantially as set forth.

6. A wood separator for storage batteries made from resinous woods, the pores whereof have been freed of their natural obstructing substances leaving a substantially pure cellulose structure, substantially as set forth.

7. A wood separator for storage batteries made from wood of the character described from which the pore-obstructing substances have been removed leaving a substantially clear cellulose structure, substantially as set forth.

8. A storage battery separator comprising a clear cellulose structure obtained from resinous woods, substantially as set forth.

In witness whereof, I have hereunto set my hand and seal at Indianapolis, Indiana, this 9th day of April, A. D. nineteen hundred and twenty-one.

HORACE W. NORDYKE. [L. S.]

Witnesses:
E. W. BRADFORD,
C. D. TURNER.